| United States Patent [19] | [11] Patent Number: 4,715,483 |
| --- | --- |
| Hobson et al. | [45] Date of Patent: Dec. 29, 1987 |

[54] ANTI-ROLL BACK DEVICE

[76] Inventors: Keith J. Hobson, 23 Charnock Wood Rd., Sheffield S12 3HL; Brian Hartley, 51 Hady Crescent, Hady Hill, Chesterfield, both of England

[21] Appl. No.: 849,545

[22] Filed: Apr. 8, 1986

[30] Foreign Application Priority Data

Apr. 9, 1985 [GB] United Kingdom ............... 8509022

[51] Int. Cl. ..................... B60K 41/28; B60K 41/26
[52] U.S. Cl. .................................. 192/4 A; 192/3 H
[58] Field of Search ............. 192/3 H, 3 S, 13 A, 192/4 A, 8 R, 8 A, 17 R, 17 A, 17 C; 188/77 R

[56] References Cited

U.S. PATENT DOCUMENTS 4,053,032 10/1977 McDonald ..................... 188/77 R
4,460,072 7/1984 Morner et al. ................. 188/77 R

FOREIGN PATENT DOCUMENTS 1187775 2/1965 Fed. Rep. of Germany .... 192/17 R

*Primary Examiner*—George H. Krizmanich
*Attorney, Agent, or Firm*—Trexler, Bushnell, Giangiorgi & Blackstone, Ltd.

[57] ABSTRACT

An anti-roll back device for vehicles is of the general type where a loop or noose is caused to tighten on a drive shaft or a brakedrum on the drive shaft when the drive shaft attempts to make unwanted reverse rotation. To improve on this construction, we propose a construction where the loop or noose extends around a cranked member pivotally mounted in closely spaced relationship to the drive shaft or brake drum, and an arrangement to pivot the cranked member between a first position where the loop or noose can engage the drive shaft or brake drum and prevent the opposite rotation, and a second position to render the loop or noose inoperative during any period where the drive shaft or brake drum is positively required to be rotated in the reverse direction and there being further structure to hold the crank in its second position until the drive shaft or brake drum has ceased rotating in the reverse direction.

14 Claims, 8 Drawing Figures

ANTI-ROLL BACK DEVICE

This invention relates to an anti-roll back device for location between drive and driven means, and is particularly, but not necessarily exclusively, concerned with an anti-roll back device for motor vehicles.

In the ordinary way when a vehicle is being driven uphill and is brought to a halt, the hand brake is applied to hold the vehicle stationary. With many vehicles the hand brake is not nearly so efficient as the foot brake and consequently, to guarantee preventing the vehicle from rolling backwards, the vehicle may need to be left in gear. When the bringing of a vehicle to a halt is a temporary manoeuvre, such as at a junction, at traffic lights, or because of traffic congestion, there is a temptation for the driver to use the clutch and not to apply the hand brake. Because the vehicle is held stationary by having the engine driving in a forward gear and by holding the clutch partly open so that there is slip at the clutch plates, this inevitably causes unnecessary wear on the clutch plates. Particularly when a vehicle is brought to a temporary halt, the possibility of the vehicle rolling backwards is greatly increased with inexperienced drivers, particularly those who are at the learning stage, and it is quite well-known that vehicles rolling backwards downhill is a source of many traffic accidents.

An effective anti-roll back device is described and claimed in GB Application No. 2129077 and which in particular discloses a form of anti-roll back device where a loop or noose of a flexible material formed from or faced with a friction material passes around either a drive shaft or a brake drum associated with the drive shaft, the arrangement being such that when the drive shaft or the brake drum is being driven in one "forward" direction the loop or noose is caused to slacken and hence allow the shaft or brake drum to freely rotate, and the instant the drive shaft attempts to rotate in the opposite direction, the loop or noose is caused to tighten on the shaft or brake drum and hence prevent that opposite rotation. Such a construction is hereinafter referred to as an anti-roll back device of the type defined.

The object of the present invention is to provide an improved form of anti-roll back device of the type defined.

According to the present invention, an anti-roll back device comprises engagement means in the form of a loop or noose extending around a rotary drive shaft of a drive unit or a brake drum associated with the drive shaft, and located in relation to the drive shaft or the brake drum such as to allow free rotation of the drive shaft or the brake drum in a first direction and engage the drive shaft or brake drum to prevent rotation in a second, opposite direction, said loop or noose extending around a cranked member pivotally mounted in close spaced relationship to the drive shaft or brake drum, and there being means to pivot the cranked member between a first position where the loop or noose can engage the drive shaft or brake drum and prevent the said second, opposite rotation, and a second position to render the loop or noose inoperative during any period where the driven unit is positively required to be rotated in the reverse direction and there being further means to hold said crank in its second position until the drive shaft or brake drum has ceased rotating in the reverse direction.

The means to hold the crank in its said second position until the drive shaft or brake drum has ceased rotating in the reverse direction may be an end fitting to which one end of loop or belt is secured, lying in close proximity to the shaft or drum, having pin means around which the belt is looped, and being slidably mounted on further pin means around which the belt is also looped, before passing around the crank to an anchor point from the other end of the belt. Thus, with the crank in its first position, contact between the loop or belt and the shaft or drum rotating in its first (forward) direction induces a loading on the end fitting to hold it in a first (upper) position. In this condition, any attempt of the shaft or drum to rotate in the opposite (reverse) direction has the result of immediate tightening of the loop or belt on the shaft or drum, to prevent that rotation. When reverse rotation is required, the crank is moved to its second position thus preventing the loop or belt from tightening on the shaft or drum. However, as the shaft or drum is rotated in the reverse direction, slight contact between the loop or belt and the shaft or drum applies a load to the end of the fitting where the loop or belt is connected, to move the fitting to a second (lower) position. This applies tension to the belt in its section extending from the integral pin means on the end fitting, around the pin means on which the end fitting is mounted, and around the crank to the anchor point, sufficient to prevent movement of the crank to its first position until the shaft or drum has ceased rotating. To allow the crank to move to its first position, either the drive shaft can be rotated in the forward direction to urge the end fitting to its upper position, or drive means can be provided to act on the end fitting to move it to its upper position, in both instances to release the tension in the loop or belt passing around the crank. By holding the cranked member in its second position, there is the complete elimination of shock loading if the means to pivot the crank to its first position becomes operative before the end of e.g., a reversing manoeuvre of a vehicle.

The loop or noose may be of flexible friction material but is preferably of an appropriate plastics material.

The cranked member may be formed by a pivot rod on which are mounted two spaced, parallel plates bridged at their free ends by a rod around which the loop or noose is to pass, the cranked member being located internally of a casing housing the loop or noose mechanism and the brake drum when provided.

There are several possibilities of providing a positive rotation of the cranked member between its operative and inoperative positions. For example, the crank may be spring loaded to its operative position where pin means on the crank engages in a notch in a pivotally mounted plate, which plate is also spring loaded to the operative position. Here it is preferred to provide a solenoid acting on the plate, and when positive reverse rotation is required, the solenoid is activated to rotate the plate and release the pin means from the notch, and when the tension induced into the loop or belt passing around the crank, referred to above, causes the crank to rotate to its second position. Once reverse rotation of the shaft or drum has ceased, removal of that tension, also as described above, and deactivation of the solenoid, allows the spring loaded plate to swing to its operative position and the crank to rotate to bring the pin means into engagement with the notch. When a spring loaded plate is provided, advantageously, a second notch is provided in which the pin engages in the inoperative position. This has the advantage of allowing manual movement of the crank and mechanical holding of the crank in the inoperative position, when, e.g., a mechanic is required to work on the vehicle.

Alternatively, the cranked member can be associated with a weighted member and such that with e.g. a vehicle on level ground or facing downhill, gravity acts on the weighted member to hold it in a position that allows the cranked member to remain in an inoperative position, as it is not possible for, e.g. a vehicle, to roll back freely on level ground or facing downhill, but with the vehicle facing uphill gravity acting on the weighted member swings the weighted member to a position where the crank can swing under the tension in the belt to its operative position. Thus, a friction clutch may be provided on the cranked member, against which bears a spring loaded ratchet wheel, the weighted member being provided with a pawl for selective engagement with the ratchet wheel. With, e.g., a vehicle on level ground or facing downhill, gravity acting on the weighted member swings it to a position where the pawl is held in a position clear of the ratchet wheel. However, with e.g., a vehicle facing uphill, the weighted member is swung to a position where the pawl can drop into engagement with the ratchet wheel. With then the cranked member in its first position the drive shaft or brake drum around which the loop or noose passes can freely rotate in a first forward direction and will be held against any attempt to reverse by tightening of the loop or noose as has been described above. When a positive reverse rotation is required, the tension induced into the loop or noose acts on the cranked member which will resist rotation until such time as the force applied to the clutch is such as to cause it to exceed the predetermined load applied by the spring, and with the ratchet wheel held stationary by the pawl, the cranked member can rotate to its second, inoperative position. In an alternative construction employing a weighted arm, a clutch member associated with the crank is formed by a pulley wheel engaged by a friction member at the end of a plunger acted on by the weighted member. Thus, with e.g., a vehicle facing uphill the greater the angle of inclination the greater is the force applied by the weighted member on the plunger, and the greater is the force that has to be applied to the cranked member to rotate it to its second position to allow a positive reverse drive of the shaft or brake drum.

As a still further alternative, the cranked member may be connected to a selectively activated hydraulic or pneumatic piston and cylinder unit. Said unit may be double acting to pivot the cranked member between its operative and inoperative positions, or may be single acting, e.g., to hold the crank in its inoperative position, and deactivatable to allow the cranked member to swing under the tension in the belt to its operative position. This alternative has the additional possible advantage of linking the hydraulic or pneumatic piston/cylinder unit into the braking system of e.g., a vehicle and when the anti-roll back device can serve as a fail-safe braking system.

As yet another alternative, a cam member can be provided to bear against e.g. pin means extending from the cranked member, selective rotation of the cam member causing pivotal movement of the cranked member between its operative and inoperative positions, and spring means are provided to urge the cranked member into engagement with the surface of the cam member. Thus, after rotation of the cam has put the crank in the inoperative position, it is maintained in that position until reverse rotation of the shaft or drum has ceased by the tension in the belt, as has been described above, release of that tension then allowing the spring to return the crank to its operative position and into contact with the cam.

In a still further possible form of construction, where the cranked member and its movement between its first and second positions can be as any of the possible forms of construction referred to above, and where a brake drum is provided, the brake drum may be freely rotatable on a shaft extending from a drive plate which drive plate is attached e.g., to the drive flange of the differential of a vehicle, and there being pivotally mounted pawls on the drive plate for selective engagement with a ratchet ring on the brake drum. Thus, with the drive shaft of the vehicle, and thus the drive plate of the differential rotating in a first, forward direction, centrifugal force swings the pawls outwardly and away from the ratchet ring. In this condition, slight contact between the brake belt and the brake drum holds the drum stationary. As the drive shaft is halted, the pawls fall into engagement with the ratchet ring, and any reverse movement will then attempt to drive the brake drum in that direction, permitted or prevented in accordance with the cranked member being in its first or second position as has previously been described.

In the forms of construction where the belt end fitting is positively driven to its position where the cranked member can swing to its first position, there is provided an additional highly advantageous safety factor. Thus, if a vehicle is being reversed downhill, and is inadvertantly knocked out of gear, it is possible for the vehicle to travel downhill out of control. By positively driving the belt end fitting to its operative position, the anti-roll back device is immediately activated to serve as an emergency brake.

With motor vehicles, and with the anti-roll back device conveniently located at the connection of the drive shaft to the differential, it is with some embodiments of the invention, necessary to disconnect the drive shaft from the differential and to fit the device between the end of the shaft and the differential. However, it is possible with the invention to form the anti-roll back device as a self contained unit to slip over the drive shaft, which unit is secured to the differential casing, thereby avoiding the need to disconnect the drive shaft from the differential.

The invention will now be described by way of example with reference to the accompanying drawings in which.

Figure 1:
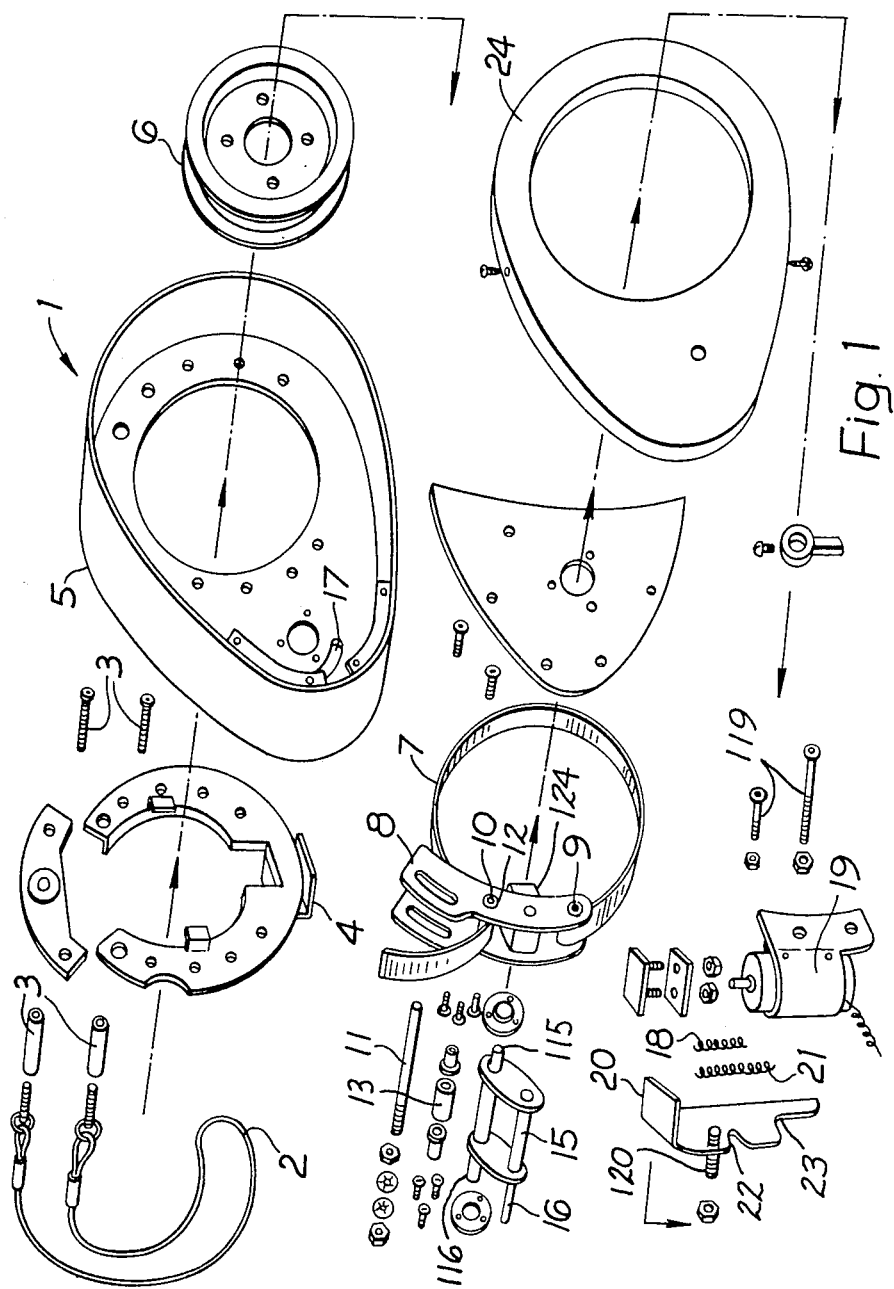
FIG. 1 is an exploded perspective view of one embodiment of anti-roll back device according to the invention.
Figure 2:
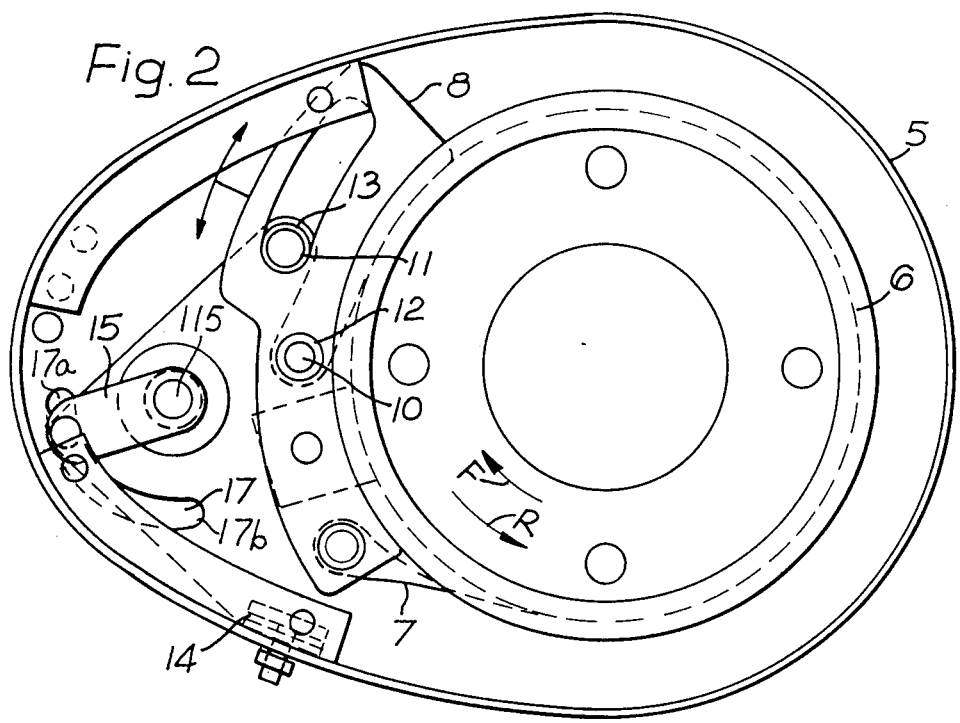
FIG. 2 is an elevation of the assembled anti-roll back device with the front cover removed.
Figure 3:
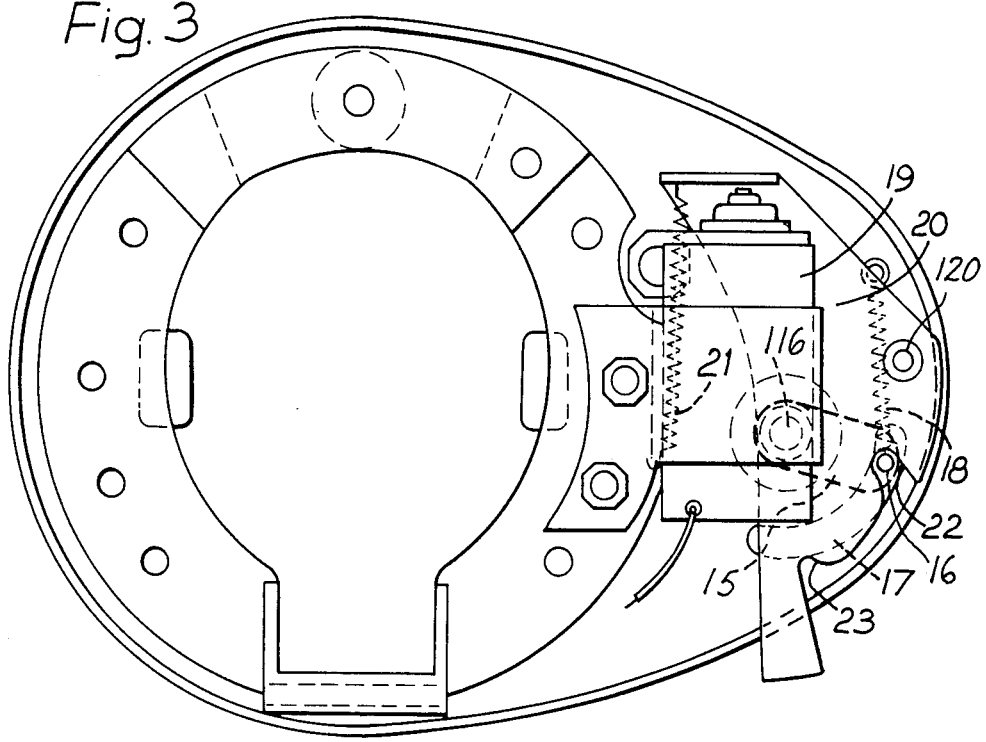
FIG. 3 is a rear view of the assembled anti-roll back device of FIG. 1 showing the location of an activating solenoid.

In FIGS. 1 to 3 an anti-roll back device for a motor vehicle is formed as a unit 1 attached to the differential of the vehicle by a wire tie 2 secured to the unit by bolts 3. The unit is a push fit over the differential casing at the pinion to the drive shaft connection, and the tie extends around the differential casing and engages a hook 4 on the unit. Within the unit casing 5 is a brake drum 6 fitted on the vehicle drive shaft (not shown) and attached to the vehicle drive plate by screws. Also within the unit is a loop noose or brake belt 7 secured at one end between the arms of a slide bar 8 or end fitting, the belt extending around the brake drum from a pin 9 at one end, below a pin 10 centrally of the arm and around a pin 11 at the other end of the arm. The pins 10, 11 each have a roller 12, 13 mounted on them to assist in the movement of the belt, and the slide bar is slidably mounted in the casing on the pin 11. The brake belt 7 then extends to a fixing or anchor point 14 on the inside of the casing. Located between the slide shoe and the casing is a pivotally mounted crank means or cranked arms or member 15 around which the brake belt passes on its way to the fixing point 14. The cranked arm has a pin 16 extending through a curved slot 17 in the casing. The cranked arm 15 is urged to a first or upper position (shown in FIGS. 2 and 3) wherein pin 16 is held adjacent a radially outer end 17a of slot 17 by a spring 18 engaging the pin 16 and secured to the casing.

Externally of the unit, a solenoid 19 is provided, secured to the unit casing by bolts 119, the solenoid acting on a plate 20 pivotally secured at pivot belt 120 to the casing and loaded into contact with the solenoid by a spring 21. The plate 20 has a notch 22 engaged by the pin 16 in the first position of the cranked arm, and a second notch 23 to be engaged by the pin 16 in a second or lower position (not shown) of the cranked arm as will be described below.

The casing is closed by a cover plate 24 secured to the casing 5 by screws.

Thus, when the vehicle is moving in a forward direction, and with the cranked arm in its first position, the direction of rotation F (see FIG. 2) of the drive shaft and hence the brake drum is such as to cause pin 16 to be drawn to the second position, adjacent a radially inner end 17b of slot 17, the noose to slacken around the brake drum and thereby allow the brake drum to run freely within the noose. With the vehicle ascending a hill and with the vehicle brought to a halt any tendency for the vehicle to roll backwards causes an attempted reverse rotation R (see FIG. 2) of the drive shaft and hence the brake drum and when the noose belt tightens on the brake drum to prevent its rotation in this, opposite, reverse direction. Thus, with the vehicle in any forward gear and with the clutch depressed, or with the vehicle in neutral, there is no need to apply the hand brake, as the anti-roll back device effectively serves as a brake to prevent the accidental rolling back of the vehicle.

When the vehicle is required to move in a reverse direction, the solenoid is activated to rotate the plate 20 to release the pin 16 from the notch 22, and when the tension induced into the brake belt extending around the cranked arm causes the cranked arm to rotate to a second position, where the pin 16 engages the notch 23 in the plate 20, and when the brake belt is slackened sufficient to prevent it from tightening on to the brake drum during reverse rotation of the drive shaft. The provision of a spring loaded pivotal plate 20 has the further advantage that it can be moved manually to put the pin 16 into the notch 23 e.g. when a mechanic is required to work on the vehicle and requires the anti-roll back device to be inactive.

Once reverse rotation of the drive shaft and hence the brake drum has ceased, deactivation of the solenoid allows the spring 21 to rotate the plate 20 back to its first position and the spring 18 to bring the cranked arm back to its first position and where the pin 16 engages in the notch 22 in the plate.

To prevent the slide bar 8 from making direct contact with the brake drum, a block 124 of hard wearing, low friction plastics material is provided and secured between the arms of the slide bar.

Figure 4:
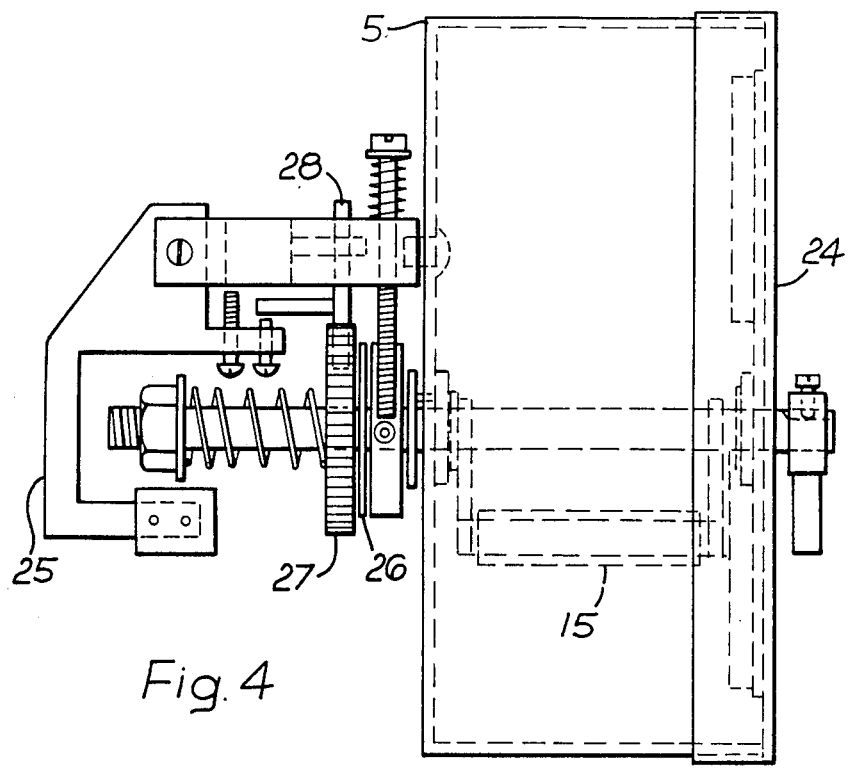
FIG. 4 is a side elevation of a second embodiment of anti-roll back device according to the invention.

In FIG. 4, the cranked arm 15 within the casing is associated with a weighted member 25 secured externally of the casing 5. Thus, when the vehicle is on level ground or is facing downhill, gravity acts on the weighted member to hold the cranked member in its second position rendering the anti-roll back unit inactive, but when the vehicle faces uphill, the weighted member swings to a position, where the tension induced in the brake belt swings the cranked member to its first position, to render the unit active. This is achieved as illustrated by extending the pivot of the cranked arm out of the casing and securing to a friction clutch 26 against which bears a spring loaded ratchet wheel 27, the weighted member 25 being provided with a pawl 28 for selective engagement with the ratchet wheel. With, e.g., a vehicle on level ground or facing downhill, gravity acting on the weighted member swings it to a position where the pawl 28 is held in a position clear of the ratchet wheel. However, with e.g., a vehicle facing uphill, the weighted member is swung to a position where the pawl can drop into engagement with the ratchet wheel. With then the cranked member in its first position the drive shaft or brake drum around which the loop or noose passes can freely rotate in a first forward direction and will be held against any attempt to reverse by tightenting of the loop or noose and has been described above. When a positive reverse rotation is required, the tension induced into the loop or noose acts on the cranked member which will resist rotation until such time as the force applied to the clutch is such as to cause it to exceed the predetermined load applied by the spring, and with the ratchet wheel held stationary by the pawl, the cranked member can rotate to its second, inoperative position.

Figure 5:
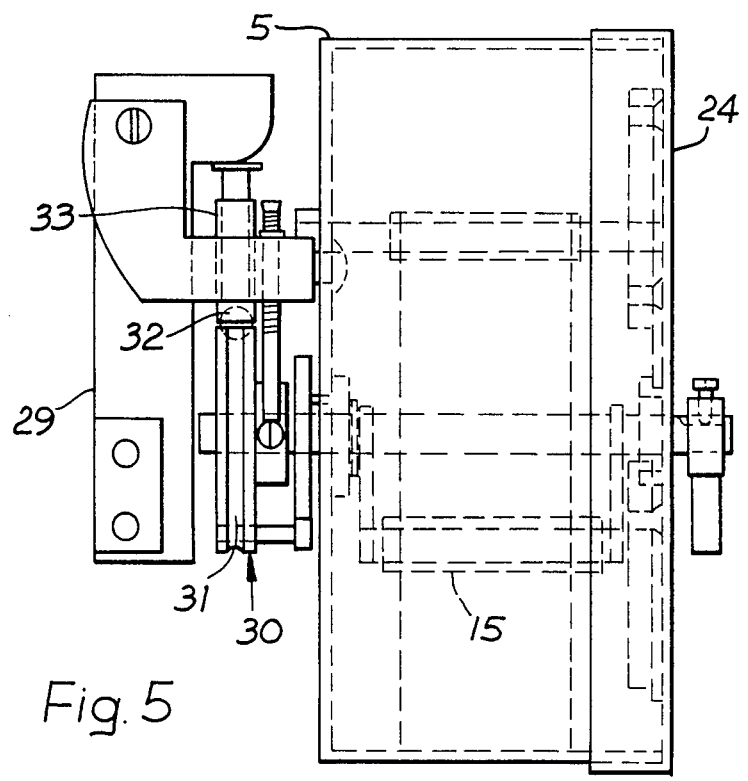
FIG. 5 is a side elevation of a third embodiment of anti-roll back device according to the invention.

In the form of construction shown in FIG. 5, a pivotally mounted weighted arm 29 is located externally of the casing, and the pivot of the cranked arm 15 within the casing 5, extends out of the casing to a friction clutch 30. Here a clutch member associated with the crank is formed by a pulley wheel 31 engaged by a friction member 32 at the end of a plunger 33 acted on by the weighted member 29. Thus, with e.g., a vehicle facing uphill the greater the angle of inclination the greater is the force applied by the weighted member on the plunger, and the greater is the force that has to be applied to the cranked member to rotate it to its second position to allow a positive reverse drive of the shaft or brake drum.

Figure 6:
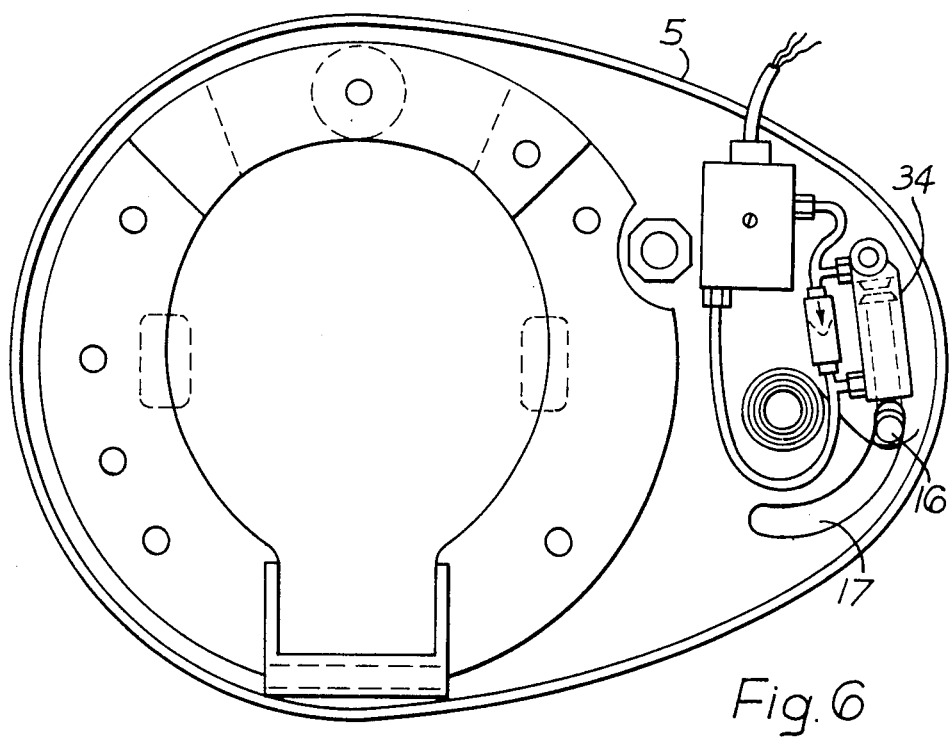
FIG. 6 is a side elevation of a fourth embodiment of anti-roll back device according to the invention.

FIG. 6 illustrates a form of construction where the cranked member is acted on by a piston and cylinder unit 34. The piston and cylinder unit may be double acting to drive positively the cranked member between its first and second positions, or may be single acting, to hold the cranked member in its second inoperative position, and deactivated to allow the tension in the brake belt to swing the cranked member into its first operative position. This has the additional advantage of enabling the piston and cylinder unit to be linked into the brake system of the vehicle, and when the anti-roll back device can serve as a brake fail-safe device.

Figure 7:
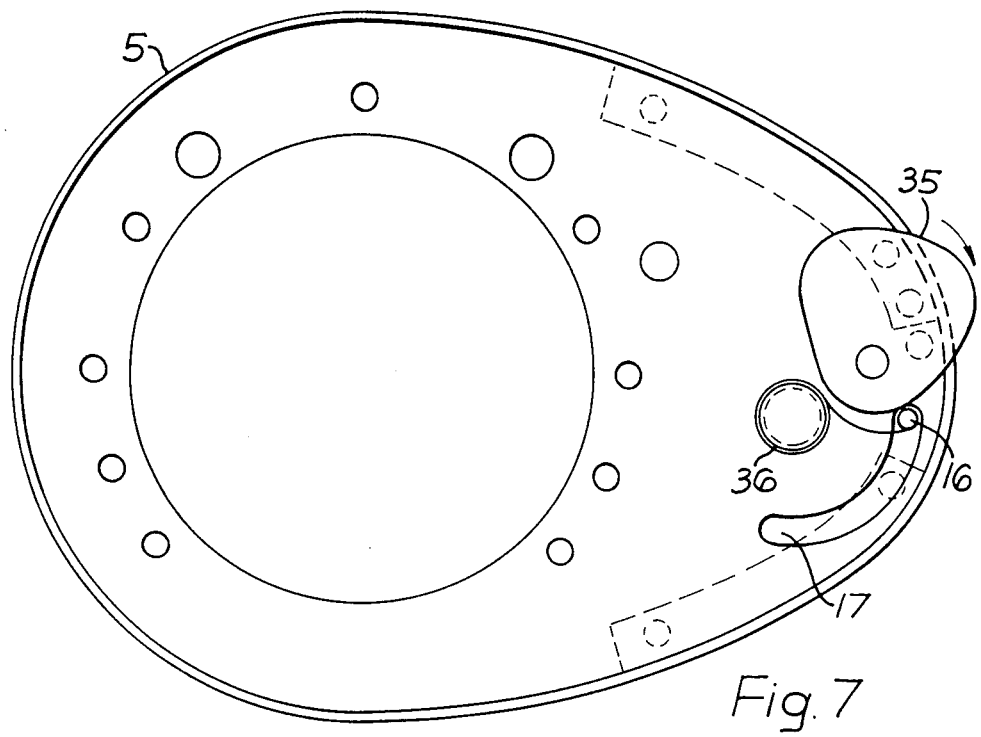
FIG. 7 is a side elevation of a fifth embodiment of anti-roll back device according to the invention.

In FIG. 7, the pin 16 of the cranked member 15 is acted on by a cam 35 pivotally mounted on the casing 5, there being spring means 36 acting on the pin 16 to urge it into contact with the cam surface. Selective rotation of the cam is effected by motor drive means acting on the cam spindle, to rotate the cranked arm between its operative and inoperative positions. With the cranked arm in the inoperative position, and with the drive shaft positively rotating in the reverse direction, the pin 16 will not follow the cam on its rotation to its first position, by virtue of the tension in the belt as has been discussed earlier, and until that tension has been relaxed by the drive shaft ceasing to rotate, the spring 36 then causing the cranked arm to rotate and bring the pin into contact with the cam.

Figure 8:
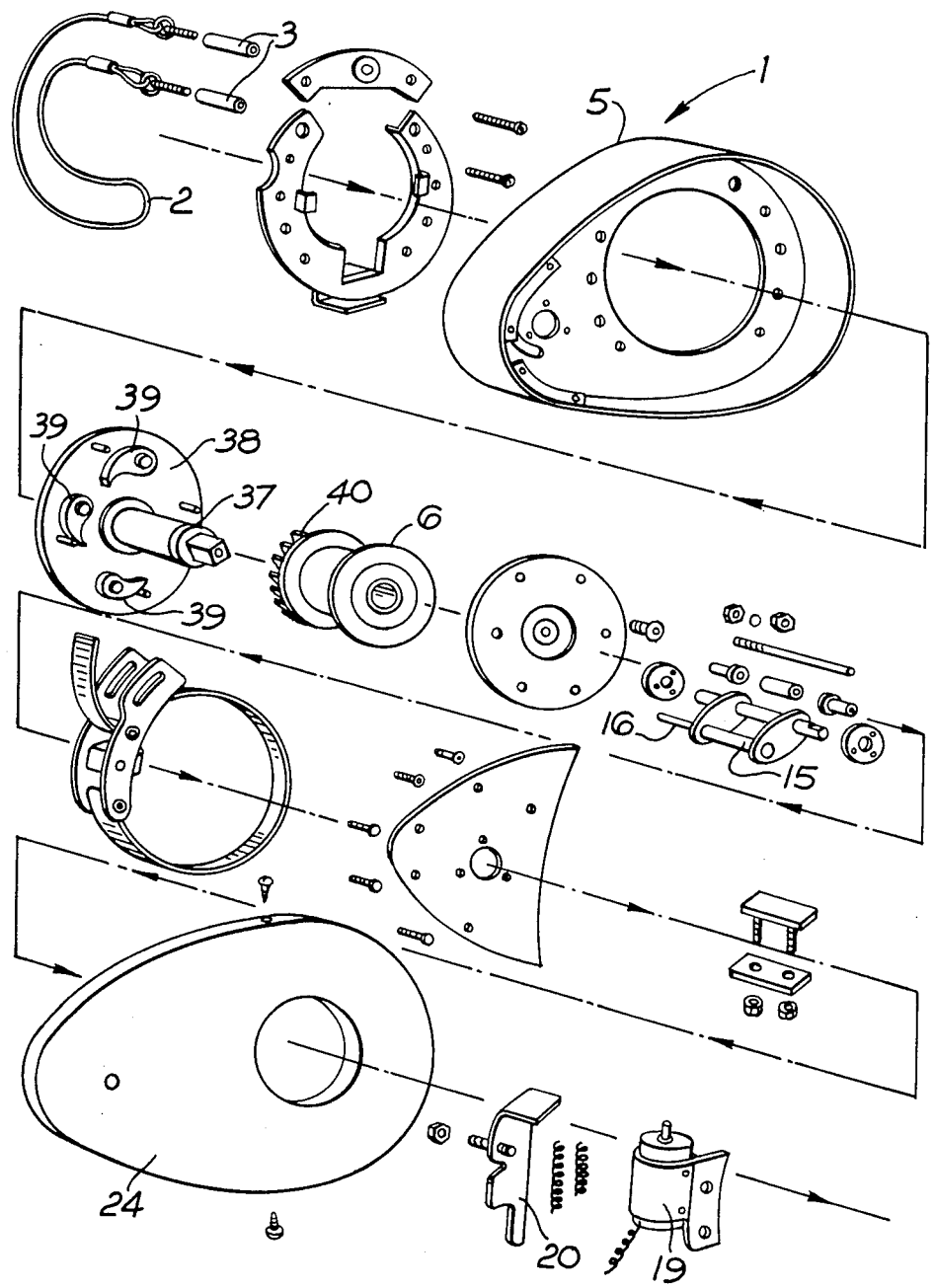
FIG. 8 is an exploded perspective view of a sixth embodiment of anti-roll back device according to the invention.

FIG. 8 illustrates a form of construction that has essential similarity with the construction of FIG. 1. However, in this embodiment the brake drum 6 is freely rotatable on a shaft 37 of a drive plate 38 that is attached to the drive flange of the differential of a vehicle. Mounted on the drive plate 38 are pivotally mounted pawls 39 for selective engagement with a ratchet ring 40 on the brake drum. Thus, with the drive shaft of the vehicle, and thus the drive plate of the differential rotating in a first, forward direction, centrifugal force swings the pawls 39 outwardly and away from the ratchet ring 40. In this condition, slight contact between the brake belt 7 and the brake drum 6 holds the drum stationary. As the drive shaft is halted, the pawls fall into engagement with the ratchet ring, and any reverse movement will then attempt to drive the brake drum in that direction, permitted or prevented in accordance with the cranked member being in its first or second position as has previously been described.

We claim:

1. A device for the selective prevention of the rotation of a rotatable member in one only of its two directions of rotation, comprising: an end fitting slidably mounted in close proximity to the rotatable member for movement between an upper position and a lower position and supporting first and second spaced pin means; elongate belt means attached by one end thereof to the end fitting and extending around the rotatable member, the other end of the belt means extending below said first pin means on the end fitting and over said second pin means on the end fitting and to an anchor point; crank means pivotally mounted in closely spaced relation to the rotatable member, around which the belt means passes on its passage from said second pin means on the end fitting to the anchor point; means for selectively pivoting said crank means between a first position where it acts on the belt means to put the belt means in a condition where rotation of the rotatable member in a first, forward, direction is permitted and rotation in a second, reverse direction is instantly prevented, and a second position where the belt means is in a condition where rotation of the rotable member in said reverse direction is permitted, and means to hold said cranked means in said second position until said rotatable member has ceased its rotation in said second, reverse, direction.

2. A device as in claim 1, wherein to allow the crank means to move to its first position, the rotatable member is rotated in the forward direction to urge the end fitting to its upper position.

3. A device as in claim 1, wherein to allow the crank means to move to its first position means are provided to act on the end fitting to move it to its upper position.

4. A device as in claim 1 wherein the belt means is of flexible friction material.

5. A device as in claim 1, wherein the crank means is formed by a pivot rod on which are mounted two spaced, parallel plates bridged at their free ends by a rod around which the belt means is to pass, the crank means being located internally of a casing housing of the belt means and rotatable member when provided.

6. A device as in claim 1 wherein to provide positive rotation of the crank means between its first and second positions, the crank means is spring loaded to its first position where pin means on the crank means engage in a notch in a pivotally mounted plate, which plate is also spring loaded to a position for engaging the pin means in the notch.

7. A device as in claim 6, wherein a solenoid is provided acting on the plate, and when positive reverse rotation is required, the solenoid is activated to rotate the plate and release the pin means from the notch, such that the tension induced into the belt means passing around the crank means, causes the crank means to rotate to its second position.

8. A device as in claim 6 or claim 7, wherein a second notch is provided in the plate in which the pin engages when the crank arm is in the second position.

9. An anti-roll back device as in claim 1, wherein a weighted member is associated with the crank means such that, in use, with a vehicle on level ground or facing downhill, gravity acts on the weighted member to hold it in a position that allows the crank means to remain in its second, inoperative position, but with the vehicle facing uphill gravity acting on the weighted member swings the weighted member to a position where the crank means can swing under the tension in the belt means to its first, operative position.

10. An anti-roll back device as in claim 9, wherein a friction clutch is provided on the cranked member, against which bears a spring loaded ratchet wheel, the weighted member being provided with a pawl for selective engagement with the ratchet wheel.

11. An anti-roll back device as in claim 9, wherein a clutch member associated with the crank is formed by a pulley wheel engaged by a friction member at the end of a plunger acted on by the weighted member.

12. An anti-roll back device as in claim 1, wherein the cranked member is connected to a selectively activated piston and cylinder unit.

13. An anti-roll back device as in claim 1, wherein a cam member is provided to bear against pin means extending from the cranked member, selective rotation of the cam member causing pivotal movement of the cranked member between its operative and inoperative positions, and spring means are provided to urge the cranked member into engagement with the surface of the cam member.

14. An anti-roll back device as in claim 1, wherein the brake drum is freely rotatable on a shaft extending from a drive plate which drive plate is attached to the drive flange of the differential of a vehicle, and there being pivotally mounted pawls on the drive plate for selective engagement with a ratchet ring on the brake drum.

* * * * *